Nov. 15, 1927.
H. KARL
1,649,597
ELECTRIC BRAKE
Filed April 8, 1924
3 Sheets-Sheet 1
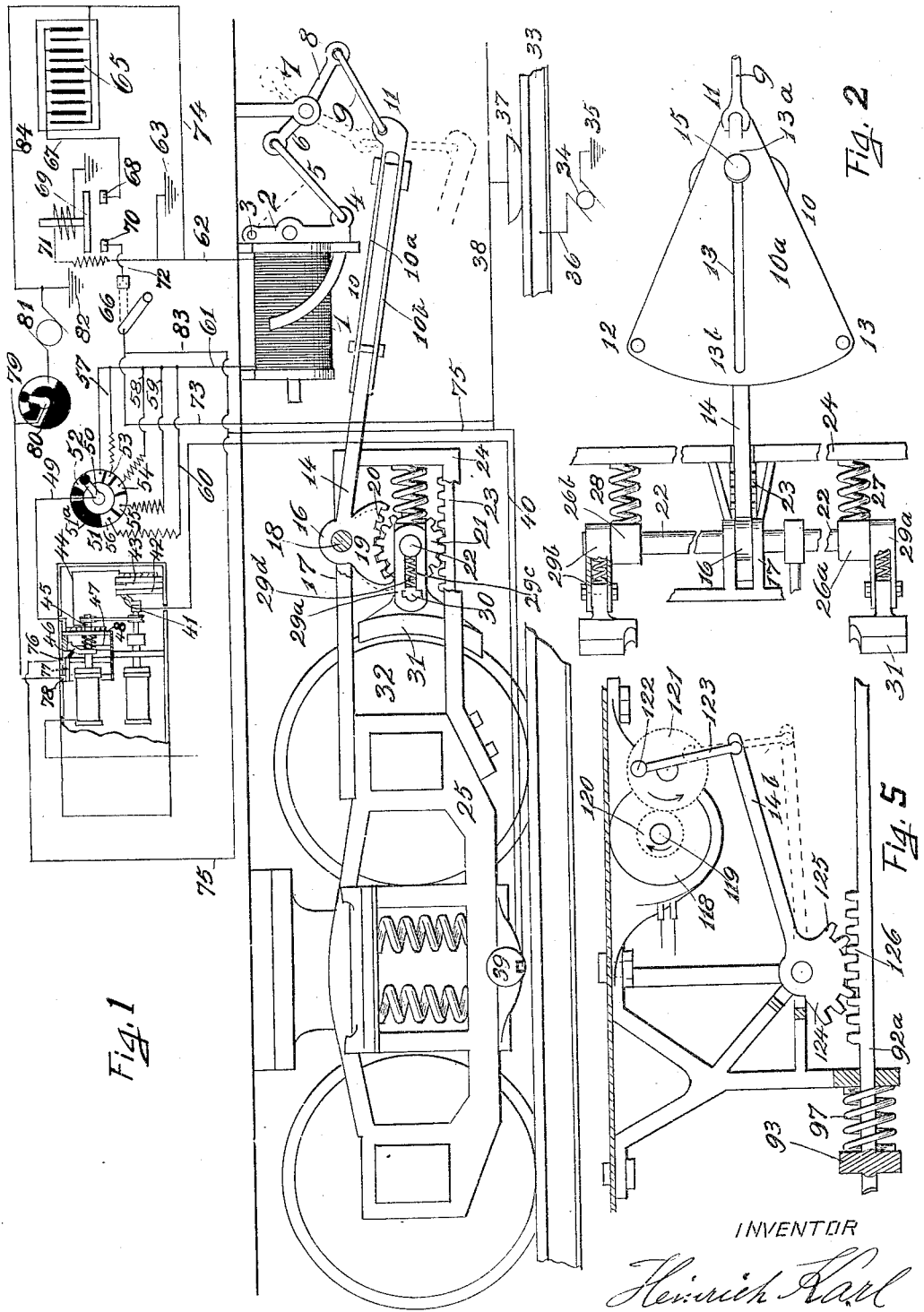
INVENTOR
Heinrich Karl

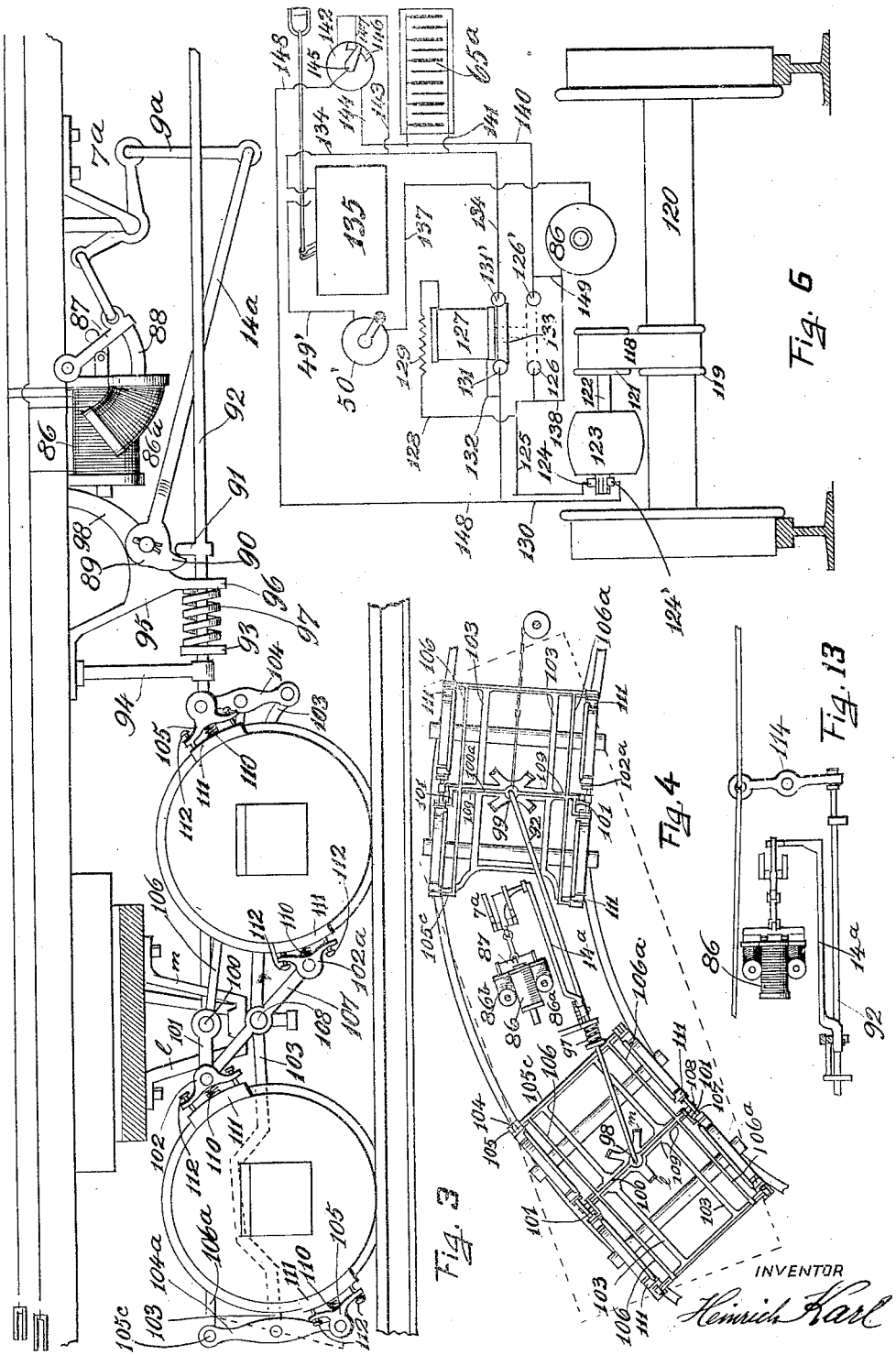

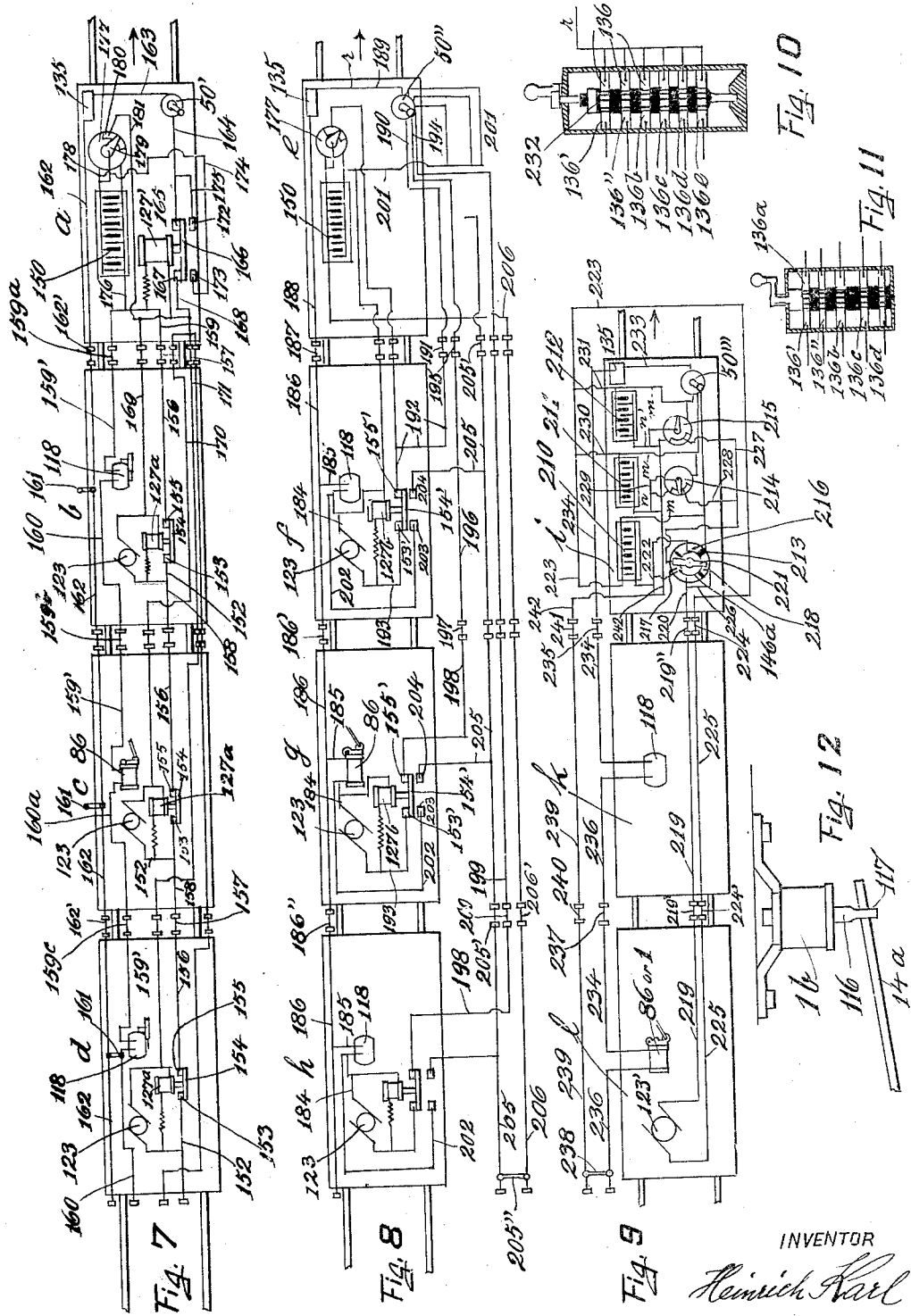

Patented Nov. 15, 1927.

1,649,597

UNITED STATES PATENT OFFICE.

HEINRICH KARL, OF JERSEY CITY, NEW JERSEY.

ELECTRIC BRAKE.

Application filed April 8, 1924. Serial No. 705,148.

My invention relates to that class of brakes which are operated by means of electricity. To insure safety this invention is so designed that at the failure of the source of electric energy or when the circuit conductors are cut or when they are otherwise unfit for the conductance of the electric current, the brakes will be applied. The device is designed for the normally closed circuit while the normally open circuit would be unsafe with the constructions of the devices of this invention.

The chief aim in making this invention has been to create a more simplified brake for trains, especially when compared with the air-brake or the electro-pneumatic brake, now extensively in use, and one which in operation is very economical, and yet very reliable and effective; and which can be employed on steam- or electrically-propelled trains, and as well, on trolley-cars and even on certain other vehicles which do not travel on rails.

For the sake of simplicity I show the device only in connection with railroad trains.

The main feature of this electric brake is that it works directly: that is to say, the electric current serves for operating the brake; while, for instance, with the electro-pneumatic brake the electric current serves chiefly for operating air-pumps, which renders the whole apparatus far more complicated. A further advantage is that the operating current does not need to be generated by separate generators operated by special motors or expensive power, like steam, electricity, etc. I show, however, a modification in which the current from the third-rail or from a trolley-wire can be used. A further advantage is that the braking action will be more uniform throughout the whole train, especially when compared with the air-brake, because electricity is more rapid than air, and the brakes therefore respond more quickly to the impulse of the electric current than to that of compressed air. Another novel feature of this invention is the employment of means which permit the smallest amount of electric energy for obtaining the desired complete or partial retraction of the brakes; and, further, this electric brake is so designed that the brake-shoes will be applied to the wheel-treads whenever the current is cut out from the electric device which is operating the brake-shoes, be it through short-circuiting, or lack of current, or damage to the electric conductors involved. Still another novel feature of the invention is the arrangement which permits the use of either an electro-magnet or an electric motor in connection with the brakes. More advantages will be pointed out in the following detailed description.

In the accompanyng drawings, wherein like characters indicate like parts, I show in Fig. 1 one type of the electric brake with an electro-magnet for operating it; the wiring connections are represented diagrammatically. In this figure the electric brake is shown as arranged on a railroad car of an electrically-propelled train, and at the same time electric current from the third-rail or from the trolley-wire is used for operating the brakes (to retract them completely or partially); a reserve battery is also employed in case of failure of the electric conductors, or in the absence of current in the third-rail or trolley-wire. This arrangement for furnishng the necessary energy for the electric brake is not so economical as those arrangements which are shown in Figures 6, 7, 8, and 9.

Fig. 2 shows from above the extendible lever in the type of the electric brake shown in Fig. 1.

Fig. 3 shows a modification of the electric brake in which three electro-magnets are employed for attracting a common armature, and wherein the arrangement of the lever and of the rods which are in connection with the brake-shoes differ from those of the type of brake shown in Fig. 1.

Fig. 4 shows from above the arrangement of the electric brake of the modification of Fig. 3, wherein that part of the car body which is situated above the trucks is removed: in this view the trucks are shown as when the car is traversing a sharp curve, so that the position of the main rod is seen as it appears when the car is passing at a curve.

Fig. 5 shows a detail which may be employed in the electric brake shown in Fig. 3. This detail represents an arrangement of a lever which is operated by an electric motor instead of by electro-magnets, as shown in Fig. 3.

Fig. 6 shows a pair of wheels of a railroad car truck whose axle serves for driving an endless belt, which, again, serves for operating a generator to thereby furnish the necessary electric energy used for holding the brakes in complete or partial retraction. The electric connections are represented diagrammatically, and show a relay which will be energized when the generator furnishes sufficient energy for holding the brakes in retracted position, while otherwise the electric current of a storage battery will be employed for this purpose; the electromagnets which in Fig. 3 are shown in side view are shown in front view in Fig. 6. An indication of an automatic control device, and of the engineer's switch are also made in this figure.

Fig. 7 shows the arrangement of the electric brakes of a train of four units wherein three of these units have generators which are driven in a manner similar to that shown in Fig. 6, and the electric motors or electromagnets of the electric brake are so electrically connected with the generators that they will be subject to control by the switch in the engineer's cab on the first train unit, and they will be subject also to automatic control for which certain devices are employed, which, however, form part of another patent application whose Serial Number is 314,588, filed July 31, 1919, or of still another patent application whose Serial Number is 349,715, that was filed January 6, 1920. On the first unit the place is indicated on which this automatic control device should be located; there is shown also a storage battery which is fed automatically whenever too small an amount of energy is contained therein; while the generators on the several train units serve to furnish the electric current for the electric brake when the train is in sufficient motion: the storage battery serves to furnish the electric current for the electric brakes when the train halts.

Fig. 8 shows a somewhat different arrangement of the electric connections on a train composed of several units: on this train there are also generators and electric brakes arranged similarly to those shown in Fig. 7; but the electric connections are so made that the electric motor or electro-magnet of a train unit will receive the electric energy for its operation only from the generator of the same train unit; or, when the train halts, or moves only slowly, the electric current for operating the electric brake will be furnished by a storage battery, and this shift will be made automatically.

Fig. 9 shows also a train with several units of which each has its electric brake (though, on the first unit, the electric motor is not shown for lack of space), which, as in Figs. 7 and 8 is only represented by a electro-magnet or an electric motor, but unlike the arrangements of Figs. 7 and 8 the electric current generated by the generators of all, or only certain of the train units will serve only for charging the storage batteries which are provided on the train, and arrangements are made whereby the electric current will be conducted automatically to "reserve" storage batteries when there is a sufficient amount of current stored in one of the batteries: the current of the storage batteries being used for operating the electric brakes.

Fig. 10 shows an arrangement of the engineer's switch wherein on one side of the commutator the contacts are separated from each other so that each may be connected with one wire only, which, again, is connected with the corresponding contact of a certain train unit, as, for instance, that shown in Fig. 8, and on the other side of the commutator the contacts are shown as electrically connected by the wires which are connected to a single wire so that this wire can be connected with an automatic control device, and additional conductors connected to said automatic control device as well as to all electric motors or electro-magnets of the electric brakes, as shown in Fig. 8.

Fig. 11 shows a modification of the switch of Fig. 10 wherein, unlike the arrangement of the switch of Fig. 10, the contacts on the right side of the commutator are not electrically connected together by wires, but each is connected only by a separate wire which is so connected to a certain electric motor or electro-magnet of an electric brake of a certain train unit that the circuit in which said electric motor or electro-magnet as well as the generator of that particular train unit is included will be closed when the commutator contact of the two corresponding contacts causes an electric connection between them. The electric brakes with this wiring arrangement may also be subject to automatic control.

Fig. 12 shows an electro-magnet (solenoid) with a plunger which, unlike those of the Figures 1 and 3, is secured vertically to the under side of the car body, whereby the plunger is directly connected to the lever 14ª of Fig. 3 or to the part 11 of Fig. 1 in such a manner as to be able to raise or lower this lever, or the part 10ª of Fig. 1, when the solenoid becomes energized or de-energized respectively.

Fig. 13 shows the main rod of the electric brake of Fig. 3 so arranged as to operate directly the fulcrumed lever which, in the arrangements on modern railroad vehicles, is the first part which is connected with the rod of the brake valve. It is therewith shown that the electric brake of the present invention can be installed on such rolling stock as is already equipped with the rods and brakes of the air-brake.

Referring to Fig. 1, the electro-magnet 1 which is secured to the under side of the coach or car body of a railroad vehicle is provided with an armature 2 which is linked at 3. At the lower part 4 of the armature 2 a chain or rod 5 is linked and is also linked to the shank 6 of the balance scale-like part 7. To the other shank 8 thereof a rod 9 is linked and also linked to the fan-shaped part 10 at the corner 11. This fan-shaped part 10 is divided into an upper and a lower part, of which the former is designated by 10ª, while the lower part is designated by 10ᵇ. The part 10ª is provided with a slot 13 which begins at 11 and holds the direction midway of the corners 12 and 13 of the part 10ª. The part 10ᵇ, however, may also have a similar slot which should correspond with the slot 13. In the space between the fan-shaped part 10ª and 10ᵇ a lever 14 is arranged and is provided with a nut 15 at its end which is so adjusted that the same can move in the slot 13. When the railroad vehicle is not traversing a curve the nut 15 is situated at the end 13ª of the slot 13, and consequently the lever 14 will be in the position shown in Fig. 2. The purpose of the slot and the shape of the parts 10ª, 10ᵇ will appear subsequently.

At the other end 16 the lever 14 is pivoted to a part 17 that is rigidly united with the truck-frame 25. Below the pivot 18 the end-part 16 of the lever 14 forms a cam 19 which is provided with teeth 20 which engage with the teeth of a pinion 21. This pinion 21 is rigidly united with the shaft 22, which latter reaches from a point which is in the vertical plane of the outer face of the right wheel to a point in the vertical plane of the outer face of the left wheel, and on the same level as the wheel-axle. The teeth of the pinion 21 engage with the teeth of a toothed rack 23, which is rigidly united with a part 24 which again, is rigidly united with the truck-frame 25. According to the drawing of Fig. 1 and Fig. 2 the rack 23 and consequently the pinion 21 of the cam 19 of the lever 14 are arranged in the middle of the shaft 22; these parts, however, could as well be arranged somewhat nearer to the one or to the other of the ends of the shaft 22.

At points between the ends of the shaft 22 and its middle part are arranged bearings 26ª, 26ᵇ against which thrust the springs 27 and 28 respectively. The springs 27 and 28 are screwed or otherwise suitably held to the part 24. Both ends of the shaft 22 are inserted in bearings of the tie-parts 29ª, 29ᵇ respectively. Each of these tie-parts has a slot 29ᶜ which serves as guide for a pivot 30 which is united with an extension which forms part of the brake-shoe 31. In the guide 29ᶜ is also arranged a spring 29ᵈ which is so positioned that it will exert pressure upon the pivot 30 and thereby hold the brake-shoe toward the left. This spring 29ᵈ, however, is far weaker than one of the springs 27, 28; it simply serves to produce lighter braking pressures. The brake-shoe 31 is, of course, so arranged that it faces the tread of the car-wheel 32. There are, therefore, two brake-shoes 31, of which one faces the tread of the right wheel and the other the left wheel 32 of a pair with a common axle. It is obvious, however, that more brake-shoes can be arranged on the car, which by means of a combination of rods may be operated simultaneously with the brake-shoes 31; in which case the main rod can be connected to the bearing 26ª or to the bearing 26ᵇ.

In the modification of Fig. 1 the electric current which energizes the electro-magnet 1 is picked up from the third-rail 33. It is thereby shown that the railroad train of which the car that is partially represented in Fig. 1 is an electrically-propelled one, wherein the electric current which is conducted by the third-rail serves at the same time for partially or wholly retracting the brake-shoes from the wheel-treads. Although it is more economical to employ the systems that are shown by Figures 3, or 7, or 8, or 9 which will be fully described hereinafter, it is of importance to show also such arrangements as may prove to be useful in connection with trolley-cars or electrically-propelled trains, since such cars or trains will be braked automatically should there not be electric current in the third-rail 33. Taking, for example, the situation in which a train may be travelling on a down grade and the third-rail current should suddenly fail, the train, if not braked, would run wild and would risk disaster before the engineer is aware of the situation.

Referring to the electric connections which are shown in Fig. 1, the current will be generated by the generator 34, and this generator is grounded at 35; the other side of the generator has the following connections: wire 36, third-rail 33, contact-shoe 37, wire 38, then comes a substitute support device 39, which, however, is not a part of this invention, but forms part of my patent application Serial No. 494,677 which was filed August 23, 1921; (this part is introduced purposely in this invention to show the adaptability of the present invention for making such combinations); the following circuit connections then are—wire 40, the contactor 41 of the automatic speed-reducing mechanism, the contact-ring 42 or contact field 43 of said mechanism, wire 44, shaft 45, and the contactor 46 of the automatic stopping mechanism, the contact ring 47 or sectional contact field 48 of this mechanism (both the automatic stopping mechanism and the automatic speed-reducing mechanism form a part of my application for patent Serial No. 652,531 which was filed July 19, 1923; or these mechanisms may form part of the patent-application Serial No. 349,715 which was filed January 6, 1920, and of which I am a co-applicant). These automatic control mechanisms may be substituted by others less standardized of which I am also a co-applicant. A description of these last mentioned automatic control devices is deemed not to be necessary. The next following electric connections of said cicuit are: the wire 49, contact 50 in the engineer's switch 51, some one of the contacts 52, 53, 54, 55, 56, the respective wire which is connected thereto. The wires 57, 58, 59, 60 are provided with resistances which are so chosen that the resistance in the wire 57 is the weakest, while that introduced in the wire 58 is somewhat stronger, that introduced in the wire 59 is still stronger and that in the wire 60 is the strongest. These wires are connected to a wire 61 which is also connected to the winding of the electro-magnet 1. To the other end of this winding a wire 62 is connected which is grounded at 63.

Assuming that the engineer uses his switch 51 and interrupts the circuit just traced by contacting the switch-contactor with an insulation 51ª, the result will be that the electromagnet 1 becomes de-energized, the strong springs 27 and 28 which have been compressed during the time the electro-magnet was energized do not encounter any appreciable resistance and press strongly against the bearings 26ª, 26ᵇ respectively, whereby the shaft 22 together with the tie-parts 29ª, 29ᵇ will be shifted to the left and the brake-shoes 31 thereby are pressed against the wheel-treads they are facing. The weak spring 29ᵈ becomes compressed thereby. The pinion 21 which moves to the left forces the cam 19 to lower the lever 14, and consequently also the parts 10ª, 10ᵇ are forced downward, whereby the balance scale-like part 7 takes the position which is indicated by the dotted lines, and the armature 2 which is not attracted by the solenoid 1 swings partly around its pivot 3 when the rod or chain 5 pulls at its lower part 4.

Assuming that the engineer places the contactor of his switch so as to contact with the contact field 56, the electric current which is allowed to pass through the resistance in the wire 60 will cause a light energization—the lightest—of the electromagnet 1, and consequently a light attraction of the armature 2 will be obtained, whereby the parts 10ª, 10ᵇ will be pulled up slightly by means of the part 7, and the lever 14 will cause the cam 19 to slightly turn the pinion 21 to the right, whereby the strong springs 27, 28 become slightly compressed. The brake-shoes, however, are not retracted thereby, because the spring 29ᵈ, which became completely compressed when the electro-magnet 1 was completely de-energized, can expand somewhat, and thereby exerts a certain pressure upon the pivot 30, whereby the brake-shoe is forced still to press against the wheel-tread which it faces, although this pressure is not such a strong one as that produced when the strong springs 27, 28 are exerting their full strength, and the electro-magnet 1 is completely de-energized.

If the engineer places the switch-contactor so that it contacts with the field 55, the somewhat stronger current will energize the electro-magnet 1 in a greater degree, and consequently will cause the brake-shoe 31 to be applied with a still lighter pressure than it will be when the contactor of the switch 51 is contacted with the contact field 56. It is shown therewith that the pressure of the brake-shoes against the wheel-treads becomes weaker the stronger the current used for energizing the electro-magnet 1. It is evident that a complete retraction of the brake-shoes from the wheel-treads is obtained when the full current is switched in. The armature 2, the part 7, the parts 10ª, 10ᵇ, the lever 14, the cam 19, the pinion 21, the shaft 22, the tie-part 29ª, and the brake-shoe 31 will be in the position shown by full lines. The spring 29ᵈ thereby can fully expand and shift the pivot 30 as far as possible to the left, whereby, however, the brake-shoe 31 will not exert any pressure upon the wheel-tread which it faces.

It is obvious that by using the lever 14 much power can be saved and consequently not so much electric current is necessary for energizing the electro-magnet in such a degree that it attracts the armature in the desired manner than would be necessary when the electro-magnet had to attract the bearing 26ª or 26ᵇ directly, or directly through its armature without the use of the part 7 and the lever 14 as well as the parts 10ª, 10ᵇ. The parts 10ª, 10ᵇ were given their particular shape for a certain purpose, namely to allow the lever 14 to be always in the same vertical plane in respect to the truck, also when the truck is traversing a curve. In this latter case the lever 14 seemingly elongates itself and takes a different angle in respect to the parts 10ª and 10ᵇ, but it simply shifts the nut 15, which is rigidly united with it at its end, further toward the end 13ᵇ of the slot 13, and that in a degree which corresponds with the degree of the curved line in which the track is laid and also the angular degree which the lever 14 takes in respect to the position of the parts 10ª, 10ᵇ depends upon the curved line which the curve of the track shows; and according to the direction of the curve of the track, the angular position of the lever 14 in respect to the position of the parts 10ª, 10ᵇ will be to the right or to the left side.

From the foregoing it is evident that the train will be stopped when no current is carried in the third-rail. To avoid the calamity which might result in such a case, a reserve power source in the form of storage batteries 65 (of which only one is shown) is provided on the train, and the current of these storage batteries can be switched in by means of the switch 66. Also for propelling the motors the current of these storage batteries may be used, and the electric connections which will illustrate this will be traced subsequently.

The current of the storage battery 65 which is to serve for the brakes is traced as follows: storage battery 65, wire 67 (the wire 67 could be connected directly with the switch 66, but it is preferable to use a relay whereby only at the de-energization thereof the current of the storage battery will be available for use, both for the operation of the brakes and for the propelling of the train), contact 68, armature 69, contact 70, of the relay 71, wire 72, switch 66, wire 73, wire 38 then follow again all those electric connections which have been traced after the wire 38 to the wire 62; to the wire 62 the wire 74 is connected which is also connected to the other side of the storage battery.

For propelling the motors of the train other electric connections are employed after part of the wire 38; and these are the following: wire 75 which is connected to the wire 38, contact 76, contactor-part 77, contact-part 78, (contact 76, contactor-part 77 and contact-part 78 are parts of the automatic control device), wire 79, the engineer's switch 80, the electric motors of the train (of which only one, 81, is shown), and ground 82.

For propelling the train in case there is no current available in the third-rail, the following electric connections are to be employed for propelling the motors, at least until current from the third-rail (or trolley-wire can be picked up: storage battery 65, wire 67, contact 68, armature 69 of the relay 71, contact 70, wire 72, switch 66, wire 83, wire 75, contact 76, contactor-part 77, contact 78, wire 79, the engineer's switch 80, the train motors (of which only one, 81, is shown), wire 84, and storage battery 65.

Referring to Fig. 3, there is a widely different arrangement shown, although electro-magnets are also employed. In this modification there are three electro-magnets (solenoids) 86, employed for attracting a common armature 87; they are secured to the under side of the car body. Two of these solenoids (86$^a$, 86$^b$) have a curved shape, and the cores 88, 89 which are used in connection therewith are also curved to correspond with the shape of the solenoid. In the view of Fig. 3 only one (86$^a$) of the curved solenoids is shown, while in the top view (Fig. 4) both are shown. There is also a balance-scale-like device employed similarly to that shown in Fig. 1, but instead of being in connection with a part 10$^a$, the rod 9$^a$, which performs the same function as the rod 9 in Fig. 1, is connected to the end of a lever 14$^a$ which differs chiefly from the lever 14 of Fig. 1 in that it has no toothed cam at its pivoted end 89, but is provided with a hook 90 by means of which an extension 91 and therewith the brake-rod 92 with which said extension is rigidly united will be pushed to the right when the electro-magnets 86, 86$^a$, 86$^b$ are sufficiently energized. The brake-rod 92 which extends from a point which is in the vertical plane of the turning point of one of the trucks of the railroad vehicle to a similar point which is in the vertical plane of the turning point of the other truck (see also Fig. 4) is also provided with a disk-like extension 93, through the center of which it is passed, but rigidly united. At suitable places the brake-rod 92 is suspended by hangers 94 and 95, which are secured to the under side of the car body. The lower end of the hanger 95 is formed as a disk-like part 96, similar in diameter to the part 93, but having a hole in its center through which the brake-rod is passed and movably held therein. Between the disk-like part 93 and the part 96 a strong coiled spring 97 is so arranged that it surrounds the brake-rod 92. The pivot of the lever 14$^a$ is rigidly united with the part 98, which, again is suitably and strongly secured to the under side of the car or coach body, so that it can withstand the strain which it must sustain when the lever 14$^a$ is swung partly around its pivot through the pull exerted by the lever 9$^a$ when the balance scale-like part 7$^a$ is operated by the armature 87 when this is attracted by the energized electro-magnets 86, 86$^a$, 86$^b$: hereby the brake-rod 92 will be pushed to the right and consequently the strong spring 97 becomes compressed to a more or less considerable degree in just the proportion in which the electro-magnets are energized, whereby the spring 97 exerts a more or less strong pressure upon the part 96. At 98 and 99 (see Fig. 4) which are the ends of the brake-rod 92, pivots are provided as fulcrums to cross-bars 100, 100$^a$. To the ends of these crossbars 100, 100$^a$ are pivoted other short bars 101 to which, again, the brake-shoe holders 102 are pivoted. Rigidly united with the truck is the brake-frame 103 which is so arranged as to form the hold and support and therefore also the pivots for the levers 104, 104$^a$, on which, again, are pivoted brake-shoe holders 105, which latter are held and operated by the levers 104, 104$^a$ in a well-known manner. The levers 104, 104$^a$ are pivoted to a crossbar 105$^c$, and this crossbar 105$^c$ is again fulcrumed to rods 106, 106$^a$, which at their other end are pivoted in a suitable way to the crossbar 100. The rod 107 is fulcrumed at 108 with the extension 109 of the brake-frame 103, and to the two ends of this rod 107 are pivoted the brake-shoe holders 102, 102ᵃ respectively. The arrangement of these rods which serve for the operation of the brakes is according to well-known principles. Herewith I show only one of the examples of one of these rod-arrangements which might be employed in cooperation with the electro-magnets 86, 86ᵃ, 86ᵇ, the balance scale-like part 7ᵃ, rod 9ᵃ, lever 14ᵃ in connection with the brake-rod 92, and following these arrangements the brake-rod 92 when pushed to the right according to the view of Fig. 3 and also Fig. 4, will pull the brake-bar 100 to the right whereby also the rods 106, 106ᵃ will be similarly pushed to the right. If, however, the spring 97 has a chance to push the rod 92 to the left, then also the brake-bar 100, the rods 106, 106ᵃ will be pushed to the left and an application of the brake-shoes to the treads of the wheels will result. The application of the brake-shoes 111, which latter are held by the brake-shoe holders 102, 102ᵃ, 105 results in a degree of pressure against the wheels which depends upon the degree of de-energization of the electro-magnets 86, 86ᵃ, 86ᵇ. To obtain a greater number of braking degrees, that is, of pressures of different strengths, springs 110 are arranged within the brake-shoe holders 102, 102ᵃ, 105 and are so arranged as to thrust against the rear face of the brake-shoes. The brake-shoes 111 themselves are provided with pins 112 which are passed through holes in their respective brake-shoe holders. These pins 112 may be provided with nuts so as to prevent them from slipping out of the holes in the brake-shoe holders. The springs 110 serve a similar purpose as the springs 29ᵈ in Fig. 1, though they may be arranged in a somewhat different manner from that shown in Fig. 1.

To show that still other arrangements can be made for the operation of the brakes, I show in Fig. 13 a shorter brake-rod 92, and connect this rod to the fulcrumed lever 114 which may be similarly arranged as that usually employed in connection with the air-brake system. This fulcrumed lever is similar to that which in the air-brake system is connected with the rod of the brake-cylinder. It is thus evident that also in connection with my electric brake the same numerous rod-arrangements can be adapted which serve in connection with the air-brake system. The brake-rod 92 of Fig. 13 will be operated in a similar way as the brake-rod 92 of Fig. 3, and the difference between these two brake-rods consists in that the brake-rod 92 of Fig. 13 is shorter than that of Fig. 3 and that the ends thereof are not connected to brake-rods 100.

While in Figs. 1 and 3 the electro-magnet, and the electro-magnets respectively are so arranged as to operate first a balance scale-like part, like 7 or 7ᵃ, there is another arrangement possible which is shown in Fig. 12, whereby the electro-magnet 1ᵇ (solenoid) is so arranged as to permit the operation of a plunger 116, that is the rising and sinking thereof to various positions according to the degree of energization of the solenoid 1ᵇ. The plunger 116 which will then move in a vertical direction is at best provided with a ring 117 on its lower end, and the respective parts, either an extension of the part 10ᵃ of Fig. 1, or the lever 14ᵃ of Fig. 3 is passed through the ring but so that it cannot slip out of it during its upward pull.

Instead of electro-magnets an electric motor could be employed which, as shown in shown in Fig. 5 is arranged as follows: The electric motor 118 is suitably secured to the under side of the car or coach body. The armature of this electric motor is formed as a shaft 119 on one of its ends as usual, and on this shaft 119 is mounted a cogwheel 120 whose teeth engage the teeth of another cogwheel 121, which might have a greater diameter than the cogwheel 120. To the cogwheel 121 there is attached a pivot 122 and a rod 123 is pivoted thereto. The lower end of the rod 123 is pivoted to the lever 14ᵇ, which fulfills the same function as the lever 14ᵃ of Fig. 3, but, instead of having a hook, this lever 14ᵇ is provided with a cam 124 which is toothed on its lower segment-shaped border. The teeth 125 of this cam mesh with the teeth 126 of the brake-rod 92ᵃ, and this rod 92ᵃ may have the connections as shown in Fig. 3, or it may be so arranged and formed as to suit the numerous brake-rod arrangements of which only one is indicated in part in Fig. 13.

The foregoing is the specific description of the brake-arrangements on one of the units of the train or on some trolley-car, etc. However, for controlling all the brakes in unison from a certain place, as, for instance, in the engineer's cab, certain circuit arrangements are necessary.

In Fig. 1 I have shown already that the brakes can be operated by the electric current of the third-rail, but one of the chief aims in this invention is also to show that the brakes can be operated by electric current that is generated in a more economical way than that shown in Fig. 1. For this purpose the Figs. 6, 7, 8 and 9 show arrangements wherein the electric current is initially generated by generators which are driven by a moving part of the train, such as the axle of a pair of wheels. In Fig. 6 one of these arrangements is shown, whereby the endless belt 118 is led around a guide 119 of the axle 120 and also around the pulley 121 which is arranged on a shaft 122, which is connected with the armature of the generator 123, and so arranged as to cause it to revolve. The generator 123 is a D. C. generator. So far the arrangement of the means for operating this generator is well-known.

To the current collecting brush 124 is connected the wire 125 and the other end of this wire is connected to a contact 126, one of the two lower ones of the relay 127. Another wire 128 is connected to wire 125 and is provided with a resistance 129, and the other end of the wire 128 is connected to the winding of the relay 127. To the other current-collecting brush 124' is connected the wire 130, which is also connected to the contact 131 (one of the two upper ones) of the relay 127. To the wire 130 is also connected the wire 132, which is also connected to the lower end of the winding of the relay 127, and therewith a circuit is created which energizes the relay 127, assuming that the generator is being operated by the belt 118 through the revolving axle 120. If sufficient current is generated to energize the relay 127 in such a degree that the armature 133 will be attracted, the latter will then contact with the two upper contacts 131, 131', while in the dropped position the armature 133 will contact with the contacts 126, 126'.

To the contact 131' is connected the wire 134 which is also connected to the contact 141 of the automatic control mechanism shown in Fig. 1 (in Fig. 6 the electric contacts of the automatic control mechanism are not shown; they are contained in the box designated by 135). The other electric connections of the automatic control mechanism which is contained in the box 135 are the following, according to Fig. 1, whereof only numerals are recited: 42, 43, 44, 45, 46, 47, 48; the wire 49 is identical with the wire 49' of Fig. 6. The next electrical connections are: the engineer's switch 50', shown also in Fig. 1, but in a somewhat different form. This switch 50' may be one of the kinds shown either in Fig. 10 or Fig. 11, or of another suitable approved type not specifically mentioned herein. To the respective contact in said switch 50' which might be the contact 136 of Fig. 10 or the contact 136$^a$ of Fig. 11, the wire 137 is connected, and is also connected to one end of the winding of the electro-magnet 86. This electro-magnet 86 can as well be the electro-magnet 1 of Fig. 1, or the electric motor 118 of Fig. 5. To the other end of the winding of this electro-magnet 86 is connected the wire 138, and this wire is again connected to the wire 125. Assuming that the relay 127 is sufficiently energized to attract the armature 133, a circuit will be closed which has the following electric connections, designated here only by their numerals: 123, 124', 130, 131, 133, 131', 134, 41, 42, 43, 44, 45, 46, 47 or 48 (the electric connections 41 to 48 inclusive are not shown in Fig. 6, but in Fig. 1) 49', 50', 137, 86, 138, 125, 124 and 123.

Assuming that the relay 127 is de-energized, which happens when there is no current generated by the generator 123, when, for instance, the train, etc., halts, or when not enough current is generated—that is, when said generator does not produce an amount of energy sufficient to energize the relay 127 through the resistance 129, the armature 133 drops and connects the two contacts 126, 126', and thereby closes a circuit which includes a storage battery 65$^a$, which then furnishes the current for the energization of the electro-magnet 86. The electric connections then are as follows: storage battery 65$^a$, wire 140, contact 126', relay armature 133, contact 126, wire 125, wire 138, winding of the electro-magnet 86, wire 137, switch 50', wire 49', now follow the electric connections in the automatic control mechanism which are shown only in Fig. 1, and these are here designated by the numerals 48 down to 41, then follows the wire 134, the wire 141, and again the storage battery 65$^a$.

It is thus shown that in general the storage battery 65$^a$ of Fig. 6 serves a purpose different from that of the storage battery 65 of Fig. 1.

For charging this storage battery 65$^a$ with the necessary energy which must be supplied by the generator 123, the following arrangement is made wherein a voltmeter 142 is employed, which, at the moment when an insufficient amount of electric energy is contained in the storage battery 65$^a$ automatically connects a circuit in which the generator 123 is included, and thereby effects a charging of the storage battery, continuing until the storage battery is provided with an abundant amount of electric energy, whereat the voltmeter automatically makes again an electric disconnection with the electric motor 123. The electric connections with said voltmeter 142, the electric motor 123 and the storage battery 65$^a$, respectively, are as follows: the wires 143 and 144 serve to influence the voltmeter by means of the current of the storage battery 65$^a$, so that the hand 145 on this voltmeter indicates the correct amount of energy contained in this storage battery. This hand 145 must be insulated from the mechanism of the voltmeter, but is made of a current conducting material, as, for instance, copper, etc. On the dial of the voltmeter there is a contact field 146 so arranged that the hand 145 contacts with said contact field whenever an insufficient amount of energy is contained in the storage battery 65$^a$. A wire 147 is connected to said contact field and to the wire 143 which, again, is in electric connection with the storage battery 65$^a$ through the wires 134 and 141. To the hand 145 is connected a wire 148 and this wire is again connected to the wire 130, which is in electrical connection with the generator 123. The other side of the storage battery which is connected by the wire 140 is brought into connection with the generator 123 by means of the following electric connections: wire 140, wire 149, wire 138, wire 125, collector-brush 124, and generator 123. It is thus shown that a circuit is closed in which the generator 123 and the storage battery 65ᵃ is included, and the electric connections are herewith recited by mentioning only the numerals thereof: 123, 124′, 130, 148, 145, 146, 147, 143, 134, 141, 65ᵃ, 140, 149, 138, 125, 124 and 123.

With the arrangement of Fig. 6 the economical system for providing energy for the operation of the brakes of a train or a trolley-car or other vehicle is shown in principle. The electric arrangements of Fig. 6 may serve for instance, on a trolley-car while for a train the electric arrangements may deviate somewhat from those shown in Fig. 6, because more electric devices are required to be operated simultaneously than is the case with a single car as, for instance, on a trolley-line.

In Fig. 7 it is shown that every one of the train units which are designated by $a$, $b$, $c$, $d$, are provided with the electric brake, of which, for the sake of simplification, is shown only the electric device, which, on the units $b$ and $d$ are electric motors, while the unit $c$ is provided with an electro-magnet. The electric means of the electric brake of the unit $a$, which is assumed to be the engine in which the engineer's switch is situated, is not shown, in order to avoid crowding in the drawing. It is also shown that the train units $b$, $c$, and $d$ are provided with a generator 123, and that there is a relay 127ᵃ on every unit and in connection with its respective generator 123.

On the unit $a$ there is a storage battery 150, and this storage battery serves the same purpose as the storage battery 65ᵃ of Fig. 6, and the charging of this storage battery is made automatically in the same way as has been explained in connection with the storage battery of Fig. 6, the electric connections being only slightly different from those shown in Fig. 6.

When the train which is represented in Fig. 7 is in motion the generators 123 are operated in a well-known manner, which also has been explained in connection with Fig. 6. If the train travels at a speed sufficiently fast to cause the generators 123 to generate sufficient energy for energizing the relays 127ᵃ, so that they completely attract their armatures, then a circuit is closed in which all the generators of the train are included, and the arrangement is such that all electric devices of the brakes, such as the electro-magnet of the unit $c$ will be equally energized because they are all included in the same circuit, which will be subject to control by the engineer by means of his switch 50′, or through the automatic control device 135.

Preferably, on the unit $a$ there is also arranged the relay 127′ which serves the same purpose as the relay 127 of Fig. 6, namely, the electric connection of the storage battery 150 in a circuit in which the electric devices of the brakes are included and this circuit will be closed when the train is halting, or moving but slowly.

The electric circuit which includes all the generators 123 of the train is as follows: The generator 123 of the unit $d$, wire 152, contact 153, armature 154 and contact 155, wire 156, connecting part 157, wire 158 of the unit $c$; this wire 158 is connected to the wire 152 of the unit $c$, and as the generator 123 of this unit $c$ is connected by the wire 152, the electric connections repeat themselves also on the unit $b$, because the electric connections on the units $d$, $c$, and $b$ are all similar, only the potential of the current that passes through the connections 152, 153, 154, 155, and 156 of the unit $b$ is about three times as strong as the potential of the current which passes through the similar electric connections of the unit $d$. To the wire 156 is connected a connecting part 157 which, again, is connected to the wire 159 of the unit $a$. This wire 159 is again connected by a connecting part 159ᵃ which is connected to the wire 159′ of the unit $b$, and this wire 159′ is connected to the respective windings of the electric motor 118 of the unit $b$, and another wire 160 is connected to the end of the wire of the last winding, so that the fields of the generator will be properly energized and set up the magnetic flux which revolves the armature. To the wire 160 is connected the connecting part 159ᵇ, and this connecting part is also connected to the wire 159′ of the unit $c$. This wire 159′ is again connected to one end of the winding of the electro-magnet 86 of the unit $c$, and to the other end of the winding is connected the wire 160ᵃ which is connected by the connecting part 159ᶜ. This connecting part 159ᶜ is again connected to the wire 159′ of the unit $d$, and this wire is connected similarly to the electric motor 118 of the unit $d$, as described in connection with wire 159′ and the electric motor 118 of the unit $b$. As there is no other train unit in the rear of the unit $d$ there is a wire 161 connected to the wire 160 of the unit $d$. The wire 160 of the unit $d$ is similarly arranged and connected to the electric motor of the unit $d$ as is the wire 160 of the unit $b$ in connection with the electric motor on this unit. The wire 161 could as well be provided with a switch, and each unit can have a wire 161 similarly arranged as the wire 161 of the unit $d$, but on all units of the train except the last one this wire shall not be connected with the wire 162 which is made a continuous conductor throughout a whole train, that is, from the last unit to the first unit, by means of the connecting parts 162' which, similarly to the connecting parts 157, 159ª, 159ᵇ, 159ᶜ connect in a well-known manner the respective electric wire of one train unit with the corresponding electric wire of the next train unit. On the unit $a$ the wire 162 is connected to the respective electric connection which follows next in the circuit that is controlled automatically by the device contained in the box 135, which mechanism may be that which is partly shown in Fig. 1, or it may be of a completely different arrangement. The wire 163 is connected to the last of the electric connections of the automatic control device which is contained within said box 135, and the other end of this wire 163 is in connection with the respective contact (or contacts) (not shown in Fig. 7, but in Fig. 10) 136 of the engineer's switch 50'. To the opposite contact 136' (see Fig. 10) is connected the wire 164 which is also connected to the contact 165 of the relay 127' (of Fig. 7). The armature 166 of this relay contacts with the contact 165, and contact 167 when in its upper position, that is, when the relay 127' is sufficiently energized.

To the contact 167 is connected the wire 168, to which are connected the wires 169, 170 and 171, which are connected to the like designated wires of the unit $b$ by means of connecting parts not specifically designated. The wire 169 of the unit $b$ is in electrical connection with the generator 123 of this unit, and the circuit in which this generator is included is thereby completed. This circuit is traced as follows, reciting only the numerals of the electric connections thereof: 123 of unit $b$, 152 of unit $b$, 153, 154, 155, 156, all of unit $b$, 157, 159, of unit $a$, 159ª, 159', 118 (of unit $b$), 160 (of the same unit), 159ᵇ, 159', 86, 160ª (of the unit $c$), 159ᶜ, 159' (of the unit $d$), 118 of the same unit, 161, conductor 162, 135, 163, 50', 164, 165, 166, 167, 168, 169 and 123 of the unit $b$.

The wire 170 which is also connected to the wire 168 is in electrical connection with the generator 123 of the unit $c$, and another circuit is thereby completed which has the same electrical connections as those which have been last designated chiefly by numerals except that part of the wire 152, then the wire 169 and the generator 123 of the unit $b$ are not included in the electrical connections of this circuit, and that the electric connections 152, 153, 154, 155, 156, 157, of the unit $c$ are included in this circuit. The wire 171 which is also connected to the wire 168 is in electrical connection with the generator 123 of the unit $d$, and therefore a circuit is completed in which the circuit connections are included which have been enumerated in connection with the circuit in which is included generator 123 of the unit $b$, except that this generator and the wires 169 and part of the wire 152 are not included, and that the conductors 152, the contact 153, armature 154, contact 155, wire 156, connecting part 157, all of the unit $d$, and the like designated electric connections of the unit $c$ are included in the circuit in which said generator 123 of the unit $d$ is included. It is thus shown that the electric devices 118 and 86 of the electric brakes on the train can be operated by a potential of energy which, according to Fig. 7, is obtained from three generators which are operated by the revolving axles of some of the train units. It is also apparent that still more train units can be joined to the train, and each of these units may be provided with a generator 123 that is operated similarly to those of the like designation of the units $b$, $c$, and $d$. The rule always will be that the connection 161 must be made only with the wires 160, 162 of the last train unit, assuming that this unit is equipped with the electric brake; otherwise it must be with the last unit having an electric brake.

It is obvious that 161 may be a switch which, on that last unit is to be closed by some one in charge when the train is made up; that is, made ready for service, while on all other train units the switch 161 is to be left open (see, for instance, the position of the switch 161 on the units $b$ and $c$). As concerns the generators 123 of the additional units, the circuit connections thereof must be so arranged as to include all the electric devices 118, 86, or 1, on the train in the circuit of the generator 123, and this circuit must be so arranged that it can be controlled by the engineer by means of his switch or automatically through the automatic control device 135. The connections therefore will be similar to those of the circuit of the generators 123 of the units $b$, $c$, and $d$, except that the corresponding wires of one train unit must be connected by a connecting part to the corresponding wires of the next train unit.

The storage battery 150 serves the same purpose as the storage battery 65ª in Fig. 6, the only difference that may be noticeable is that the storage battery 150 must hold a greater amount of electric energy than the storage battery 65ª, because more electric devices of the electric brakes must be operated therewith. The scheme for automatically charging the storage battery 150 is similar to that described in connection with Fig. 6, and therefore a brief description of the electric connections will suffice to explain the arrangement which automatically changes the circuit in which the generators 123 are included to the circuit in which the storage battery is included. This automatic changing is performed by the relay 127' which is energized when the generator 123 of the unit $b$ is operated—that is, when the train is in motion and develops a certain speed, as, for instance, at least five miles per hour. In this event the armature 166 is raised and contacts with the contacts 165, 167, whereby the circuits will be closed in which the generators of the several train units are included, provided that the engineer's switch 50' and also the corresponding mechanisms of the automatic control device 135 is in a "closed circuit" position. When, however, the train halts, or is only moving very slowly, the armature 166 will be in the dropped position, and will contact with the contacts 172, 173, whereby the circuits of the generators 123 are interrupted, but the circuit is closed in which the storage battery 150 and the electric devices 118, 86 are included. This circuit has the following electric connections: storage battery 150, wire 174, contact 173, armature 166, contact 172, wire 175, wire 164, the engineer's switch 50', wire 163, the respective electric connections in the automatic control mechanism contained in the chest 135, wire 162, the several connecting parts 162' which connect the wire 162 of one train unit with the wire 162 of the next train unit, switch 161 of the last train unit (in the case of Fig. 7, the unit $d$), wire 160, electric motor 118, wire 159', connecting part 159$^c$, wire 160$^a$, electro-magnet 86 (of unit $c$), wire 159' of this unit $c$, connecting part 159$^b$, wire 160 of the unit $b$, electric motor 118, wire 159', connecting part 159$^a$, part of wire 159, wire 176, and storage battery 150.

For automatically charging the storage battery 150, the voltmeter 177 is provided, which connects automatically the storage battery in a circuit with the generator 123 of the train unit $b$ when an insufficient amount of energy is contained in said storage battery. The scheme is similar to that already described in connection with the similar device of Fig. 6. It is apparent also that electric connections can be made in which all the generators 123 on the train are included in circuits which are to be closed by the device 177 (the voltmeter) for charging the storage battery 150. According to Fig. 7 the circuit which will be closed by the device 177 when an insufficient amount of energy is contained in the storage battery 150, which, however, does not mean that this amount of energy is not sufficient for operating the electric devices 118, 86 of the train, is as follows: generator 123 of the unit $b$, wire 152, contact 153, armature 154, contact 155, wire 156, connecting part 157, wire 159, wire 176, storage battery 150, part of wire 174, wire 178, hand 179 on the voltmeter 177, contact field 180, wire 181, part of wire 168 with connecting part, wire 169, and generator 123 of the unit $b$. It is understood that all the generators 123 on the train are D. C. generators. The voltmeter 177 receives its electric impulse from the storage battery 150.

While I have described a system in connection with Fig. 7, wherein the electric brakes on the train are operated by a current whose potential is compounded by the several generators 123, I show in Fig. 8 such electric connections whereby the potential of the current of one generator serves for the operation of one electric brake only, and the arrangement is made so that the circuit thus created includes the generator 123 and the electric device of the brake of the same unit and the respective contact parts in the engineer's switch, and also those of the automatic control device 135. Electric connections, however, are provided for making circuits in which the storage battery 150 is included, whereby all electric devices 118, 86 on the train will be operated when, for instance, the train is standing still.

Taking into consideration the unit $f$ of Fig. 8, the electric connections are as follows: generator 123, wire 184, electric motor 118, wire 185, wire 186, connecting part 187, wire 188, automatic control device 135, wire 189, switch 50'' (which is preferably of the construction shown in Fig. 10), wire 190, connecting part 191, wire 192, contact 155' of the relay 127$^b$, armature 154' of this relay, contact 153', wire 193, and generator 123 of the unit $f$. In a similar manner are controlled the electric devices 86, 118 of the electric brakes on the units $g$ and $h$, whereby the conductor 186 of the unit $f$ may serve as a conductor for the circuit of the generator 123 of the unit $g$, when the connecting part 186' is connecting the conductors 186 of the unit $f$ with the conductor 186 of the unit $g$. The following electric connections thus complete said circuit: connecting part 187, wire 188, automatic control device 135, wire 189, the engineer's switch 50'', wire 194, connecting part 195, wire 196, connecting part 197, wire 198, contact 155' of the relay of unit $g$, the armature 154' of this relay, the contact 153' of this relay, wire 193 of the unit $g$, generator 123, of this unit, wire 184 of the same unit $g$, electro-magnet 86, and wire 185 of the unit $g$.

Similar to the arrangement of the circuits in which the generators 123 of the units $f$ and $g$ are included, is also the circuit arrangement of the unit $h$, except that a conductor 199 and two more connecting parts (186'' and 200) are needed as compared with the circuit connections which include the generator 123 of the unit $g$.

When the train halts or is travelling so slowly that sufficient current is not produced by any of the generators 123 to energize its individual relay 127$^b$, whereby the current has also to flow through a resistance, the armature 154, drops and interrupts the circuit in which the respective generator 123 is included but makes a connection in a circuit in which the storage battery 150 is included. The arrangement of this last mentioned circuit is so made, however, that there will not be a short-circuit, nor a stronger energization of the nearest electric device of the electric brake, but all such electric devices as 118 and 86 will be energized equally—that is, by the same current potential, and consequently all brakes on the train will therefore be operated in the same degree and will simultaneously exert the same pressure on the treads of the wheels, corresponding to the larger or smaller amount of electric current that is energizing the electric devices of the brakes, which amount of current is controlled by the engineer's switch, or automatically by the automatic control device. Compared with other braking systems the chief advantages are its great simplicity and the rapidity with which the brakes respond to the degree of energization of the electric devices 118, 86, or 1.

Referring to the circuit in which the storage battery 150 of Fig. 8 is included, the electric connections thereof are as follows: storage battery 150, wire 201, switch 50″, wire 189, automatic control device 135, wire 188, connecting part 187, wire 186, of the unit $f$, wire 185, electric motor 118, part of wire 184, wire 202, contact 203, armature 154′, contact 204, wire 205, (the wire 205 is arranged on all train units whether there is or is not an electric brake on that unit, and a connecting part like 205′ connects the wire 205 of one unit with the wire 205 of the next train unit), at the end of the train a switch 205″ connects the wire 205 of the last unit (which in Fig. 8 is the unit $h$) with the conductor 206, which, like the conductor 205 is also provided on every train unit, and the conductor 206 of one train unit is electrically connected to the conductor 206 of the next train unit by means of a connecting part 206′; the conductor 206 of the first train unit is connected to the storage battery 150, whereby the circuit is completed in which the electric actuating device 118 of the train unit $f$ is included. The circuit which includes the electric device of the train unit $g$ (the electro-magnet 86) is traced as follows: storage battery 150, wire 201, switch 50″ wire 189, automatic control device 135, wire 188, connecting part 187, wire 186, of unit $f$, connecting part 186′, wire 186 of unit $g$, wire 185 of this train unit, electro-magnet 86, part of wire 184, wire 202, contact 203, armature 154′ and contact 204 of the relay 127$^b$ on unit $g$, wire 205, connecting part 205′, wire 205 of the unit $h$, switch 205″, conductors 206 including the connecting parts 206′ thereof and storage battery 150.

The third circuit in which the storage battery 150 and the electric actuating device of the unit $h$ (the electric motor 118) are included has electric connections similar to those shown on the unit $f$, except that the wires 186 of the units $g$ and $f$ and the respective connecting parts 186″, 186′, and 187 are added to the conductors of one of the sides of the storage battery, but on the other hand some of the conductors 205 and connecting parts 205′ are not used on the other side of the storage battery. It is thus shown that there cannot be a short-circuit which would strongly energize the electric motor 118 of the unit $f$ without the electric motor of the unit $h$ also being energized.

Through the wiring arrangements in Fig. 8 all the electric actuating devices 118, 86 are equally energized, since one generator 123 is to furnish an amount of energy equal to that of each of the others on the train which serve the same purpose in connection with the brakes, and all the circuits which include the electric actuating devices 118, 86 and the storage battery 150 are practically of the same length as respects the conductors thereof.

Also, in Fig. 8 the same scheme is employed for charging the storage battery 150 as is employed in the disclosure of Fig. 7.

Referring to Fig. 9 it is shown that the electric devices such as the electric motor 118 or the electro-magnet 86 or 1 are not in electrical connection with a generator such as is shown in Figs. 6, 7 and 8, but these electrical devices 118, 86 or 1 are operated exclusively by the current of one of the storage batteries shown on the first unit $i$.

On the train shown in Fig. 9, which consists of three units, $i$, $k$ and $l$, only one generator (123′) is shown, namely on the unit $l$. This generator is in electrical connection with one of the storage batteries 210, 211, or 212 when their respective voltmeters, either 213, 214, or 215 connect the circuit with this generator 123′. Assuming the storage battery 210 to be deficient in a certain amount of energy, the voltmeter 213 which is of the same construction as the voltmeter 142 of Fig. 6, or the voltmeter 177 of Figs. 7 and 8, except that besides the contact field 146$^a$ there are still three more contact fields 216, 217, 218 provided on the face of this voltmeter, will make an electric connection between the contact field 146$^a$ and the contact field 216 by means of the hand 221. The circuit which will be closed thereby has the following connections: generator 123′ of the train unit $l$, wire 219, connecting part 219′, wire 219 of the train unit $k$, connecting part 219″, wire 220, contact field 146$^a$ voltmeter hand 221, contact field 216, wire 222, storage battery 210, wire 223, connecting part 224, wire 225, of the train unit *k*, connecting part 224', wire 225 of the train unit *l*, and generator 123' on that train unit. If the storage battery 210 is sufficiently charged the hand 221 which is not connected by a wire like the hand 145 of the voltmeter shown in Fig. 6 or of the voltmeter 177 of Figs. 7 and 8, again takes the position in which it contacts with the contact fields 217, and 218; the contact field 218 is in electrical connection with the wire 220 by means of the wire 226. To the contact field 217 is connected the wire 227, which is also connected to the contact field of the voltmeter 215, and another wire 228 is connected to the wire 227 and to the contact field of the voltmeter 214. If there is a deficiency of electric energy in the storage battery 211, then the hand on the voltmeter 214, which, like the voltmeter 215 is constructed similarly to the voltmeter 142 shown in Fig. 6 and has also similar contact arrangements on the face, will contact with the contact field, and thereby will also make an electric connection with the storage battery 211, since the hand of the voltmeter 214 is always in electrical connection with this storage battery by means of the wire 229. In a similar way will be connected in the circuit the storage battery 212 by means of the hand of the voltmeter 215, when same contacts with the contact field on the face of this voltmeter.

To the storage batteries 211 and 212 are connected the wires 230, 231 respectively, and these wires are connected to the wire 223, which, as previously shown forms an electrical connection in the circuit of the generator 123'. It is thus shown that when the hand 221 of the voltmeter 213 contacts with the contact fields 217, 218, and the hand of the voltmeter 214 contacts with the contact field of this voltmeter a circuit is closed in which the generator and the storage battery 211 are included. If, at the same time also the hand of the voltmeter 215 contacts with the contact field of this voltmeter, then the storage battery 212 will be also in a circuit with the generator 123'. It is thus shown that there is a continuous charging of the storage batteries 210, 211 and 212. The arrangement of more than one contact field on the face of the voltmeter 213 is made purposely to allow a full charging of the storage batteries 211 and 212 only after the storage battery 210 is charged to its full capacity. In the meantime the hands of the voltmeter 214, 215 may go further on the contact-field than the hand 221 of the voltmeter would do on the contact field 146$^a$: it is thus evident that the storage battery 210 will always be charged with a sufficient amount of energy, while the amount may vary in the storage batteries 211, 212. Herewith I show only one example of the scheme for charging the storage batteries when only one generator is used on the train. If, however, more generators are employed, the electric connections may be made so that each storage battery is brought into electric connection with one generator or even more through the respective hands and contact fields of the voltmeters used in connection therewith.

According to Fig. 9 the electric devices 118, 86 or 1 of the electric brake are not operated, that is energized, by the current of any generator such as shown in Figs. 6, 7 and 8, but are operated exclusively by the current of the storage batteries 210, 211, 212. The electric energy of these three storage batteries may be switched in in unison to operate the electric devices 118, 86, or 1, or one storage battery may be automatically switched in by means of a relay when there is an insufficient amount of energy in the other battery. This latter scheme is not illustrated, but only the method for using simultaneously the energy of the three storage batteries 210, 211 and 212. Instead of compounding these storage batteries I connect a special wire to each storage battery and connect them separately to their respective contact parts in the engineer's switch 50''', which might be of the construction shown in Fig. 10 or Fig. 11, but according to the disclosure of Fig. 9 it is the switch shown in Fig. 10 which is used in the engineer's cab. The commutator 232 (see Fig. 10), the contact 136 in this switch, and the wire 233 are the next electric connections; then follow the respective electric connections of the automatic control mechanism which is situated in the box 135, the wire 234 of the train unit *i*, the connecting part 235, the wire 234 of the train unit *k*, the electric motor 118, the wire 236, the connecting part 237, the wire 234 of the train unit *l*, the electro-magnet 86 or 1 on this train unit, the wire 236 of the train unit *l*, the switch 238, the wire 239 of the train unit *l*, the connecting part 240, the wire 239 of the train unit *k*, the connecting part 241, the wire 242, wire 222 and storage battery 210; to the wire 242 are also connected the wires *n, n'* which, again, are in electric connection with their respective storage batteries 211, 212, and therewith complete also the circuit for these two storage batteries.

The engineer's switch as shown in Fig. 10 consists in its main parts of the commutator 232 in which electric contact parts are arranged in groups. In each group the contact parts are so arranged that one of them serves for fully conducting the electric current while the others are provided with resistances which are the stronger the further the respective contact part in the group is situated from the contact part which serves for fully conducting the current: there is also an insulation in the group.

The contacts 136, 136' which are arranged as to contact with the uppermost group of contact parts of the commutator are so arranged that whenever the contact 136' contacts with the full current conducting part the full current will pass through the contact 136 and through the wire r, which is similar to the wire 163 in Fig. 7, or 233 in Fig. 8. When, however, a contact part with resistance is contacting with the contact 136', the current that passes through the contact 136 and the wire r will be weaker according to the degree of resistance that is interposed; and when the contact 136' is contacting with an insulation, the flow of the current will be interrupted. The other groups of contact parts are arranged in like manner and each group is separated by an insulation. The contact 136'' may be in electrical connection with the generator of a train unit other than that with which the contact 136' (see, for instance, Fig. 8) and the next lower contact 136$^b$ may be in electrical connection with the generator of still another train unit, and so forth. Or, it may be a storage battery to which the contact 136'', 136$^b$, or 136$^c$ etc. is in electrical connection, as is exemplified in Fig. 8.

Any approved form of switch adapted for operating the electric devices 118, 86, 86$^a$, 86$^b$, or 1 with different degrees of energy may be adopted.

In Fig. 11 a modification of the switch is shown. While the contacts 136 of the switch of Fig. 10 are connected to one conductor (r), the contacts 136$^a$ on the right side of the commutator are connected to individual wires each of which is in connection with its respective electric device 118 or 86 or 1, etc., assuming that there is no automatic control device for controlling the circuits; or, if such is to be employed, it must then have a somewhat different construction than that shown in Fig. 1. Otherwise, the construction of the switch of Fig. 11 resembles that of Fig. 10.

Having herewith made a full description of the electric brake as illustrated by the drawings, I wish to make it understood that there are still other arrangements possible, especially of the circuits on a train with several units, and therefore the appended claims are made so as to cover also such arrangements when they are within the spirit and scope of this invention.

I claim:

1. In an electrically operated brake for a vehicle, an electro-magnetic-device arranged on said vehicle, an electro-magnetically responsive part connected with said electro-magnetic device and operable thereby, brake-shoes adapted to be pressed against the rims of the wheels of said vehicle, a strong spring for exerting this pressure powerfully, a lever movably connected by its one end to a rigid part of the vehicle and its other end operatively connected with said electro-magnetically responsive part to push the brake-shoes in opposition to the pressure of the strong spring when said electro-magnetically responsive part is operated by the energized electro-magnetic device, a source of electric energy, a circuit in which said source and the electro-magnetic device are included, a switch for controlling this circuit and adapted for connecting the full current and for cutting in resistances and for shutting off the current, a means for holding the brake-shoes, a second spring, this second spring being weaker than the first named spring and arranged to maintain the brake-shoes against the wheel-rims when the pressure of said strong spring is overcome by the counter-pressure exerted by said lever when said electro-magnetically responsive part is operated, according to the degree of energization of the electromagnetic device.

2. In an electrically-operated brake for a train, an electro-magnetic device, an armature connected with same, brake-shoes adapted to be pressed against the treads of the wheels of said train, a strong spring for exerting this pressure powerfully, a lever pivoted by its one end to a rigid part and by its other ends operatively connected with said armature and adapted to push the brake-shoes in opposition to the pressure of the strong spring when said armature is attracted by the energized electro-magnetic device, a source of electric energy, a circuit in which said source and the electro-magnetic device are included, a switch for controlling this circuit and adapted for switching in the full current and for connecting resistances into the circuit and also for shutting off the current, a means for holding the brake-shoes, a second spring, this second spring being weaker than the first named strong spring and arranged to maintain the brake-shoes against the treads of the train-wheels when the counter-pressure exerted by said lever against the pressure of said strong spring is such that the strong spring cannot press the brake-shoes against the wheel-treads, the second spring being arranged to expand and cease to press the brake-shoes against the wheel-treads when said lever is operated by the armature when it is fully attracted by the strongly energized electro-magnetic device and said second spring pressing the brake-shoes to the wheel-treads when said armature is not fully attracted by said electro-magnetic device and said second spring pressing the brake-shoes stronger against the wheel-treads when said armature is less powerfully attracted by the less energized electro-magnetic device.

3. In an electrically-operated brake for a train, an electro-magnetic device, brake-shoes adapted to be pressed against the treads of the wheels of said train, a strong spring for exerting this pressure strongly, a means operated by said electro-magnetic device and adapted to push the brake-shoes in opposition to the pressure of the strong spring when said electro-magnetic device is strongly energized, a source of electric energy, a circuit in which said source and the electro-magnetic device are included, a switch for controlling this circuit and adapted for connecting the full current and for cutting in resistances and for shutting off the current, a means in connection with each brake shoe for holding the brake-shoe, a second spring being so arranged on this means as to press against the brake-shoe, this second spring being weaker than the first named strong spring and arranged to press the brake-shoe against the tread of the train-wheel when the counter-pressure exerted by the first mentioned means against the pressure of said strong spring is such that the strong spring cannot press the brake-shoe against the wheel-tread, the second spring being arranged to expand and cease to press the brake-shoe against the wheel-tread when said first mentioned means is operated by the fully energized electro-magnetic device and said second spring pressing the brake-shoe to the wheel-tread when said electro-magnetic device is not fully energized, and pressing the brake-shoe stronger against the wheel-tread when the electro-magnetic device is still less energized.

4. In an electrically operated brake for a vehicle, an electric actuating device thereon, a lever pivoted to a rigid part of the vehicle and adapted to be operated by said electric actuating device, brake shoes and additional operating and holding parts in connection therewith, a strong spring tending to strongly press therewith the brake shoes against the wheel treads, said lever having additional parts being so formed as to pull by means of said additional operating and holding parts said brake shoes away from the wheel treads when the electric actuating device operates said lever and additional bars and rods and fulcrumed levers and brake beams with brake shoes thereon operated by said first mentioned additional operating and holding parts and pressing the brake shoes to the wheel treads of said vehicle when said lever is not operated by the electric actuating device or only partially operated thereby, and said additional operating and holding parts operating said additional bars and fulcrumed levers to thereby retract the brake shoes from the wheel treads when said lever is fully operated by the electric actuating device.

5. In an electrically-operated brake for a vehicle, an electric actuating device thereon, a lever pivoted to a rigid part of the vehicle, a part connected to said lever and being so constructed as to permit the lever to be shifted longitudinally and to move laterally when said vehicle passes a curve, brake-shoes arranged in guides and springs arranged in said guides and pressing against the brake-shoes, said guides being arranged on a shaft and means for operating said shaft by means of said pivoted lever, strong springs arranged to press said shaft to thereby press the brake-shoes powerfully against the wheel-treads when no counter-pressure is exerted by said lever, said part connected to said lever arranged to be operated by the electric actuating device and operating also the lever when said electric device is energized and being operated in the same degree in which said electric device is energized, the springs arranged in the guides pressing the brake-shoes to the wheel-treads though in a weaker degree when the pressure of the strong springs is opposed by said lever when operated by the partially energized electric actuating device, and the brake-shoes being completely retracted and the springs in the guides permitted to expand when said lever and connected part thereto is fully operated by the electric actuating device, additional rods and brake-shoes being in connection with said shaft and these brake-shoes arranged as to be pressed in the same degree against the wheel-treads which they face as those brake-shoes which are arranged in the guides and arranged as to be also retracted simultaneously with them.

6. In an electric brake, an electric actuating device and mechanisms adapted for operating the brakes on a vehicle that travels on rails, a source of electric power and an electric conductor along said rails, a means for picking up the current from said electric conductor, electric connections for energizing said electric actuating device with the electric current picked up from said electric conductor and a switch for controlling said current and adapted to cause the full energization of said electric actuating device and the non-energization thereof and a number of different grades of energization ranging between the full energization and the non-energization, a reserve source of electric power and means for automatically connecting this source of electric power with a circuit for energizing said electric actuating device in case of failure of the electric current of said electric conductor, means for voluntarily completing and disconnecting said last mentioned circuit.

Respectfully submitted.

HEINRICH KARL.